United States Patent [19]

Peng

[11] Patent Number: 5,370,244

[45] Date of Patent: Dec. 6, 1994

[54] COMPACT DISK CONTAINER STORAGE DEVICE

[76] Inventor: Jung-Ching Peng, P.O. Box 82-144, Taipei, Taiwan, Prov. of China

[21] Appl. No.: 182,359

[22] Filed: Jan. 18, 1994

[51] Int. Cl.⁵ .............................................. A47G 29/00
[52] U.S. Cl. ...................................... 211/40; 211/41; 211/120
[58] Field of Search ................ 211/40, 41, 120, 52, 211/53, 59.4, 59.2, 69.8; 248/316.1, 316.7

[56] References Cited

U.S. PATENT DOCUMENTS

| | | | |
|---|---|---|---|
| 160,015 | 9/1850 | Rauch et al. | 211/40 X |
| 622,911 | 4/1899 | Campbell | 211/120 |
| 779,332 | 1/1905 | Twitchell | 211/41 |
| 3,503,496 | 3/1970 | Kovarik et al. | 211/41 X |
| 3,900,109 | 8/1975 | Peterson | 211/153 X |
| 5,000,526 | 3/1991 | Comerford | 211/80 X |
| 5,301,819 | 4/1994 | Noeken | 211/40 |

*Primary Examiner*—Ramon O. Ramirez
*Assistant Examiner*—Korie H. Chan
*Attorney, Agent, or Firm*—Alfred Lei

[57] ABSTRACT

A compact disk container storage device comprising: a bracket having a left edge and a right edge, a plurality of horizontal arms extending from the left edge, and a plurality of tubular portions corresponding to the horizontal arms provided at the right edge; and a plurality of spring clips each pivotally connected between every two of the tubular portions of said bracket, each of said spring clips being formed with a left side limb and a right side limb each having an inwardly curved portion at the end, a central limb located between the two side limbs and having a front lug at the end, a first rear lug between the central limb and the right side limb, a second rear lug between the central limb and the left side limb, and a loop portion between the right side limb and the first rear lug.

1 Claim, 4 Drawing Sheets

COMPACT DISK CONTAINER STORAGE DEVICE

BACKGROUND OF THE INVENTION

Devices for storing compact disks are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry. Furthermore, it is of extreme value to provide a device which combines all of the desirable characteristics set forth above.

SUMMARY OF THE INVENTION

This invention relates to an improved compact disk container storage device.

It is the primary object of the present invention to provide a compact disk container storage device which is easy to operate.

It is another object of the present invention to provide a compact disk container storage device which can prevent the compact disk from dropping out.

It is still another object of the present invention to provide a compact disk container storage device which is simple in construction.

It is still another object of the present invention to provide a compact disk container storage device which is economic to produce.

It is a further object of the present invention to provide a compact disk container storage device which can store the compact disk in a secure but convenient manner.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE PREFERRED EMBODIMENT

Figure 1:
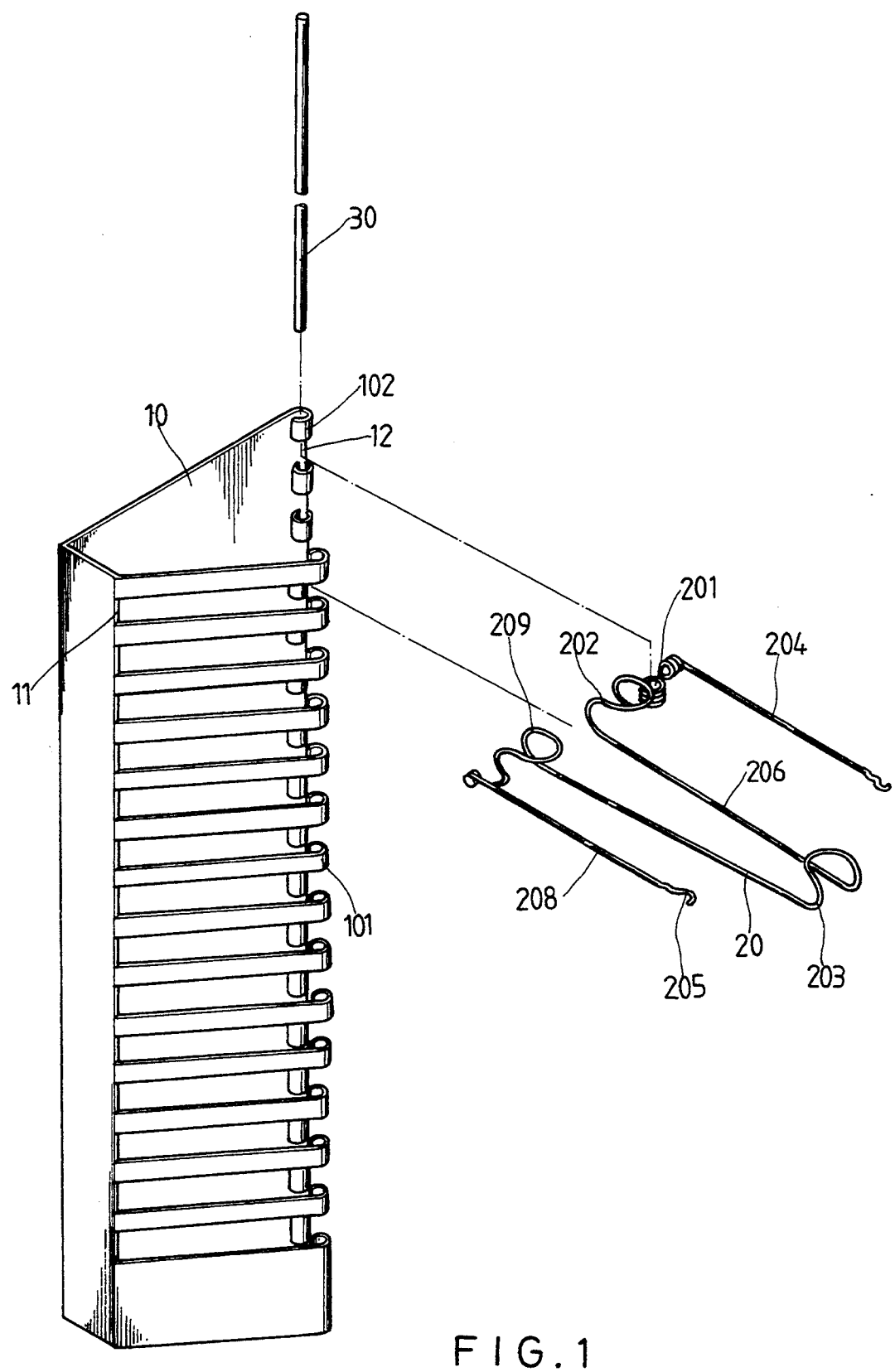
FIG. 1 is an exploded view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 5:
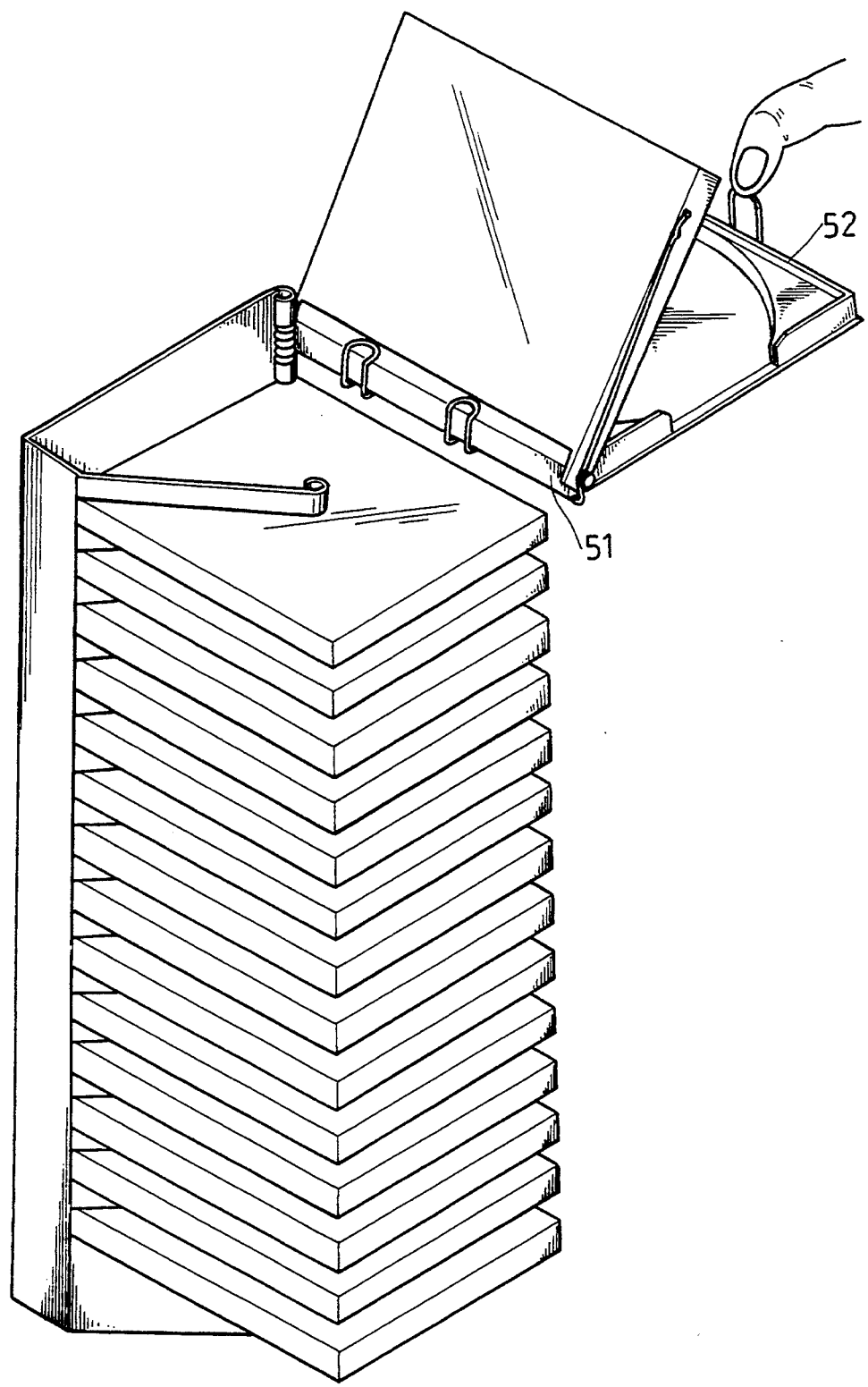
FIG. 5 is a working view of the present invention.

With reference to the drawings and in particular to FIG. 1 thereof, the compact disk container storage device according to the present invention comprises a bracket 10 having a left edge 11 and a right edge 12. A plurality of horizontal arms 101 extend horizontally from the left edge 11 and have a tubular portion 101 at the end. A plurality of tubular members 102 corresponding to the arms 101 are provided at the right edge 12. A spring clip 20 is connected between every two tubular members 102 of the bracket 10. The spring clip 20 is made of a steel wire formed with a left side limb 208 and a right side limb 204 (with respect to FIG. 1) each having an inwardly curved portion 205 at the end, a central limb 206 located between the two side limbs 204 and 208 and having a front lug 203 at the end, a first rear lug 202 between the central limb 206 and right side limb 204, a second rear lug 209 between the central limb 206 and the left side limb 208, and a loop portion 201 between the right side limb 204 and the first rear lug 202. The loop portion 201 of the spring clip 20 is pivotally connected between every two tubular portions 12 of the bracket 10 by a pin 30 extending through the tubular portions 12 of the bracket 10 and the loop portions 201 of the spring clips 20 so that the spring clip 20 can be turned out of the bracket 10 (see FIG. 5).

Figure 2:
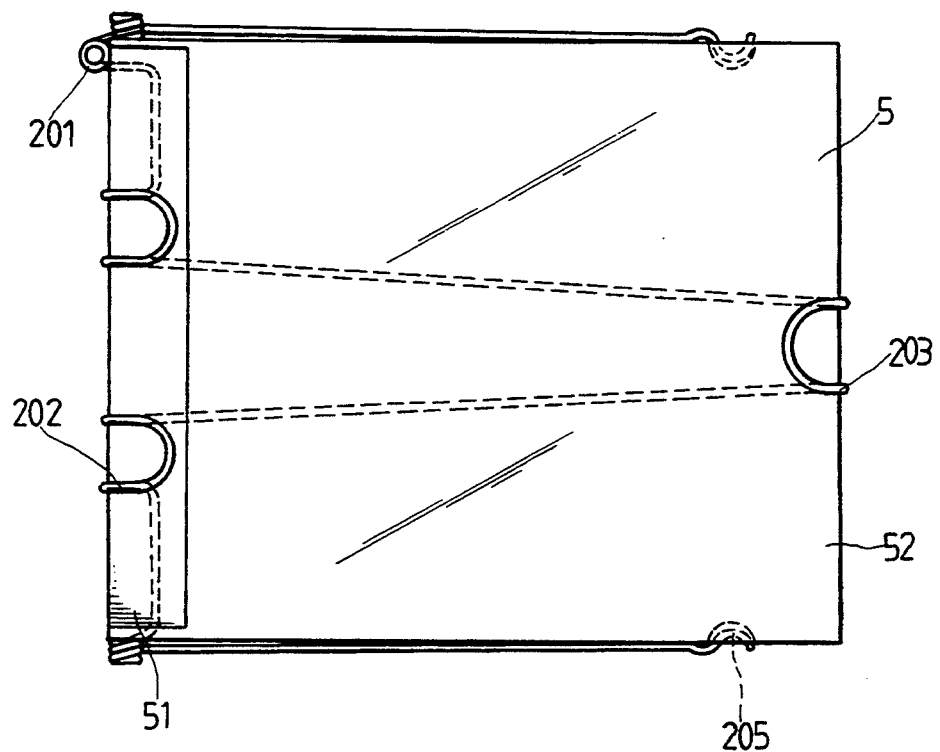
FIG. 2 is a top view of the spring clip.

When in use, first place a compact disk container 5 in the spring clip 20 in such a way that the spine 51 and the fore-edge 52 of the compact disk container 5 are engaged with the rear lugs 202 and 209 and the front lug 203 of the spring clip respectively (see FIGS. 2 and 5) and the side limbs 204 and 208 are engaged between the base and cover of the compact disk container 5.

Figure 3:
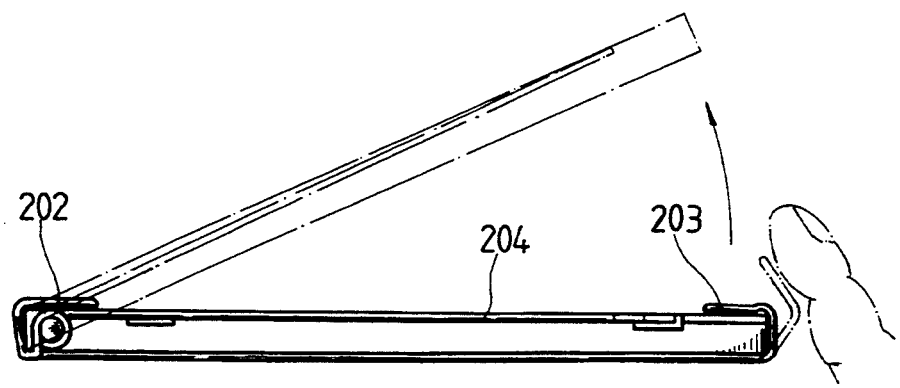
FIG. 3 shows the principle of the spring clip.

When desired to open the compact disk container 5, simply turn the spring clip 20 together with the compact disk container 5 out of the bracket 10 and push the front lug 203 outward. As the front lug 203 is pushed outward, the side limbs 204 and 208 will go upward thereby pushing open the cover of the compact disk container 5 (see FIGS. 3 and 4).

Figure 4:
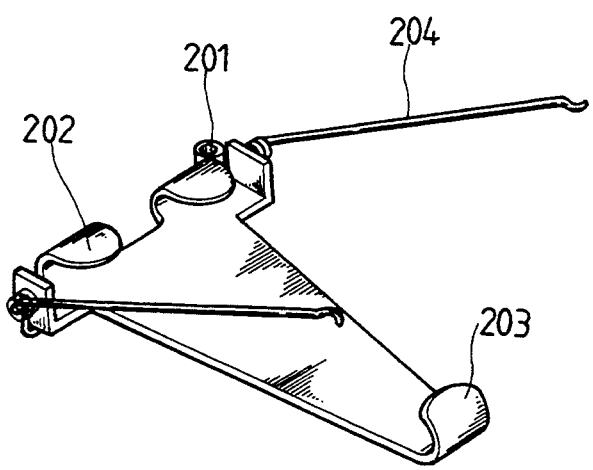
FIG. 4 is a perspective view of the spring clip.

FIG. 4 shows another preferred embodiment of the spring clip 20, wherein the spring clip includes a plastic member with two rear lugs 202, a front lug 203, and a tubular portion 201 and a spring limb 204 mounted at both sides of the plastic member.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A compact disk container storage device comprising:
    a bracket having a left edge and a right edge, a plurality of horizontal arms extending from the left edge, and a plurality of tubular portions corresponding to the horizontal arms provided at the right edge; and
    a plurality of spring clips each pivotally connected between every two of the tubular portions of said bracket, each of said spring clips being formed with a left side limb and a right side limb each having an inwardly curved portion at the end, a central limb located between the two side limbs and having a front lug at the end, a first rear lug between the central limb and the right side limb, a second rear lug between the central limb and the left side limb, and a loop portion between the right side limb and the first rear lug, the loop portion of said spring clip being pivotally connected between every two tubular portions of said bracket.

* * * * *